United States Patent
Kim (10) Patent No.: US 9,057,878 B2
(45) Date of Patent: **\*Jun. 16, 2015**

(54) LIGHT SCANNING UNIT AND IMAGE FORMING APPARATUS COMPRISING THE SAME

(75) Inventor: Hyung-soo Kim, Suwon-si (KR)

(73) Assignee: SAMSUNG ELECTRONICS CO., LTD., Suwon-Si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 13/221,076

(22) Filed: Aug. 30, 2011

(65) Prior Publication Data

US 2011/0318058 A1 Dec. 29, 2011

Related U.S. Application Data

(63) Continuation of application No. 12/475,824, filed on Jun. 1, 2009, now Pat. No. 8,026,941.

(30) Foreign Application Priority Data

Jun. 17, 2008 (KR) .......................... 10-2008-0057023

(51) Int. Cl.
| | | |
|---|---|---|
| *B41J 2/435* | (2006.01) | |
| *B41J 2/47* | (2006.01) | |
| *G02B 26/12* | (2006.01) | |

(52) U.S. Cl.
CPC ............ *G02B 26/127* (2013.01); *G02B 26/123* (2013.01)

(58) Field of Classification Search
CPC .............. G03G 2215/0402; G03G 2215/0404; B41J 2202/50

USPC ......... 347/231, 234, 235, 241–244, 248–250, 347/256–261; 359/212.2, 215.1, 359/216.1–217.1

See application file for complete search history.

(56) References Cited

U.S. PATENT DOCUMENTS

| | | | |
|---|---|---|---|
| 5,497,184 A * | 3/1996 | Saito et al. ..................... 347/257 |
| 6,317,244 B1 * | 11/2001 | Ishibe ......................... 359/204.1 |
| 6,476,955 B1 * | 11/2002 | Yoshida ...................... 359/204.1 |
| 6,700,596 B2 * | 3/2004 | Ishihara ........................ 347/134 |
| 6,856,335 B2 | 2/2005 | Ono | |
| 6,856,338 B2 | 2/2005 | Takahashi et al. | |
| 6,914,620 B2 * | 7/2005 | Yoshida et al. ............... 347/235 |
| 6,919,978 B2 * | 7/2005 | Kudo .......................... 359/204.1 |
| 6,934,061 B2 | 8/2005 | Ono et al. | |

(Continued)

OTHER PUBLICATIONS

U.S. Notice of Allowance issued May 26, 2011 in related U.S. Appl. No. 12/475,824.

(Continued)

*Primary Examiner* — Hai C Pham
(74) *Attorney, Agent, or Firm* — Staas & Halsey LLP (57) ABSTRACT

A light scanning unit includes: a light source unit; a polygon mirror for deflecting and scanning light emitted from the light source unit, in a main scanning direction, and having a plurality of deflection surfaces and a plurality of edges at which adjacent deflection surfaces meet one another; an image forming optical system for condensing the deflected light; and a synchronization detection optical system for detecting a portion of light that is divided and reflected at an edge of the polygon mirror. The light scanning unit may be incorporated into an image forming apparatus.

18 Claims, 6 Drawing Sheets

(56) References Cited

U.S. PATENT DOCUMENTS

| | | | |
|---|---|---|---|
| 7,245,409 B2* | 7/2007 | Tamaru | 359/218.1 |
| 7,253,827 B2* | 8/2007 | Ishihara | 347/235 |
| 7,667,868 B2* | 2/2010 | Hayashi et al. | 358/1.7 |
| 8,026,941 B2* | 9/2011 | Kim | 347/261 |

OTHER PUBLICATIONS

U.S. Final Office Action issued Mar. 17, 2011 in related U.S. Appl. No. 12/475,824.

U.S. Office Action issued Oct. 6, 2010 in related U.S. Appl. No. 12/475,824.

* cited by examiner

LIGHT SCANNING UNIT AND IMAGE FORMING APPARATUS COMPRISING THE SAME

CROSS-REFERENCE TO RELATED PATENT APPLICATION

This application is a continuation application of Ser. No. 12/475,824 filed Jun. 1, 2009 now U.S. Pat. No. 8,026,941 in the U.S. Patent and Trademark Office, which claims the benefit of Korean Patent Application No. 10-2008-0057023, filed on Jun. 17, 2008, in the Korean Intellectual Property Office, the disclosure of which is incorporated herein in its entirety by reference.

TECHNICAL FIELD

The present disclosure relates to a light scanning unit and an image forming apparatus comprising the light scanning unit, and more particularly, to a light scanning unit having an improved optical configuration for detecting synchronization signals.

BACKGROUND

Light scanning units that scan laser beams on a photosensitive drum to form electrostatic latent images are generally employed in image forming apparatuses, such as laser printers, copying machines, facsimile machines, or the like that reproduce images on printing media.

A conventional light scanning unit may include an optical unit having a light source emitting laser beams, a polygon mirror, and a synchronization detection optical system to obtain horizontal synchronization signals of light that is scanned according to the rotational direction of the polygon mirror. When the rotational direction of the polygon mirror varies (i.e. clockwise or counter-clockwise), an f-θ lens needs to be enlarged or the size of the polygon mirror needs to be increased, in order to allow the synchronization detection optical system to operate in the various directions. Also, in the case of two light scanning units operating around one polygon mirror and employing a cross-scanning method, synchronization detection optical systems are required for each scanning direction. This results in the same problem regarding the necessity of a larger f-θ lens or larger polygon mirror. Therefore, it is desirable to design a light scanning unit in which the rotational direction of the polygon mirror varies and that does not require large f-θ lenses or polygon mirrors.

SUMMARY

According to one aspect, a light scanning unit may include: a light source unit; a polygon mirror deflecting and scanning light emitted from the light source unit, in a main scanning direction, and having a plurality of deflection surfaces and a plurality of edges at which the adjacent deflection surfaces meet one another; an image forming optical system condensing the deflected light; and a synchronization detection optical system detecting a portion of light that is divided and reflected at an edge of the polygon mirror.

The synchronization detection optical system may be arranged to satisfy the following equation, which represents an angle relationship, $$0.9 \leq B/A \leq 1.1,$$

where A is a spacing angle of the polygon mirror and B is an angle of light that is deflected by the synchronization detection optical system, with reference to a main scanning center line of light that is deflected and scanned by the polygon mirror.

When defining an incident angle by measuring from the main scanning center line of light deflected and scanned by the polygon mirror, the incident angle of light that is incident from the light source unit to the polygon mirror may be greater than the spacing angle of the polygon mirror.

The optical width of the light in the main scanning direction, which is reflected by the polygon mirror and incident on the synchronization detection optical system, may be smaller than the optical width of light in the main scanning direction, which is incident on the polygon mirror. Moreover, the amount of light reflected at the edge of the polygon mirror and directed to the synchronization detection optical system may be smaller than the amount of light that is incident on the edges of the polygon mirror.

The synchronization detection optical system may detect, among light divided at the edge of the polygon mirror, light that is reflected at a deflection surface, at which surface light for scanning will be subsequently deflected. The synchronization detection optical system may comprise a synchronization detection lens and a synchronization detection sensor. The synchronization detection optical system may further comprise a reflection mirror for folding an optical path.

The light incident on the synchronization detection optical system may not pass through the image forming optical system. The image forming optical system may include at least one f-θ lens.

The light scanning unit may further comprise a collimating lens and a cylindrical lens interposed between the light source unit and the polygon mirror.

The light source unit may comprise at least one light source. Light emitted from at least two light sources may be respectively deflected and scanned on different deflection surfaces of the polygon mirror.

The light source unit may comprise first and second light sources, in which case the synchronization detection optical system may comprise first and second synchronization detection units detecting portions of light emitted from the first and second light sources and divided at different edges of the polygon mirror.

The first and second synchronization detection units may respectively detect, among light emitted from the first and second light sources and divided in two directions at each of different edges of the polygon mirror, light reflected at a deflection surface of the polygon mirror, at which surface light for scanning will be subsequently deflected. The first and second synchronization detection units may be arranged in a diagonal, symmetrical configuration with respect to the polygon mirror.

The image forming optical system may comprise first and second scanning lenses that respectively condense the light emitted from the first and second light sources and deflected by the polygon mirror. The light incident on the first and second synchronization detection units may not pass through the first and second scanning lenses. The first and second scanning lenses may be of the same type.

According to another aspect, an image forming apparatus may include a light scanning unit comprising: a light source unit; a polygon mirror for deflecting and scanning light emitted from the light source unit, in a main scanning direction, and having a plurality of deflection surfaces and a plurality of edges at which adjacent deflection surfaces meet one another; an image forming optical system for condensing the deflected light; and a synchronization detection optical system for detecting a portion of light that is divided and reflected at an edge of the polygon mirror.

According to yet another aspect, an image forming apparatus may include a light scanning unit, a surface to be scanned, on which light beams are scanned from the light scanning unit to form electrostatic latent images; a developing unit for developing the electrostatic latent images; and a transfer unit to which the images developed by the developing unit are transferred.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION OF SEVERAL EMBODIMENTS

Reference will now be made in detail to embodiments of the present invention, examples of which are illustrated in the accompanying drawings, wherein like reference numerals refer to like elements. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 1:
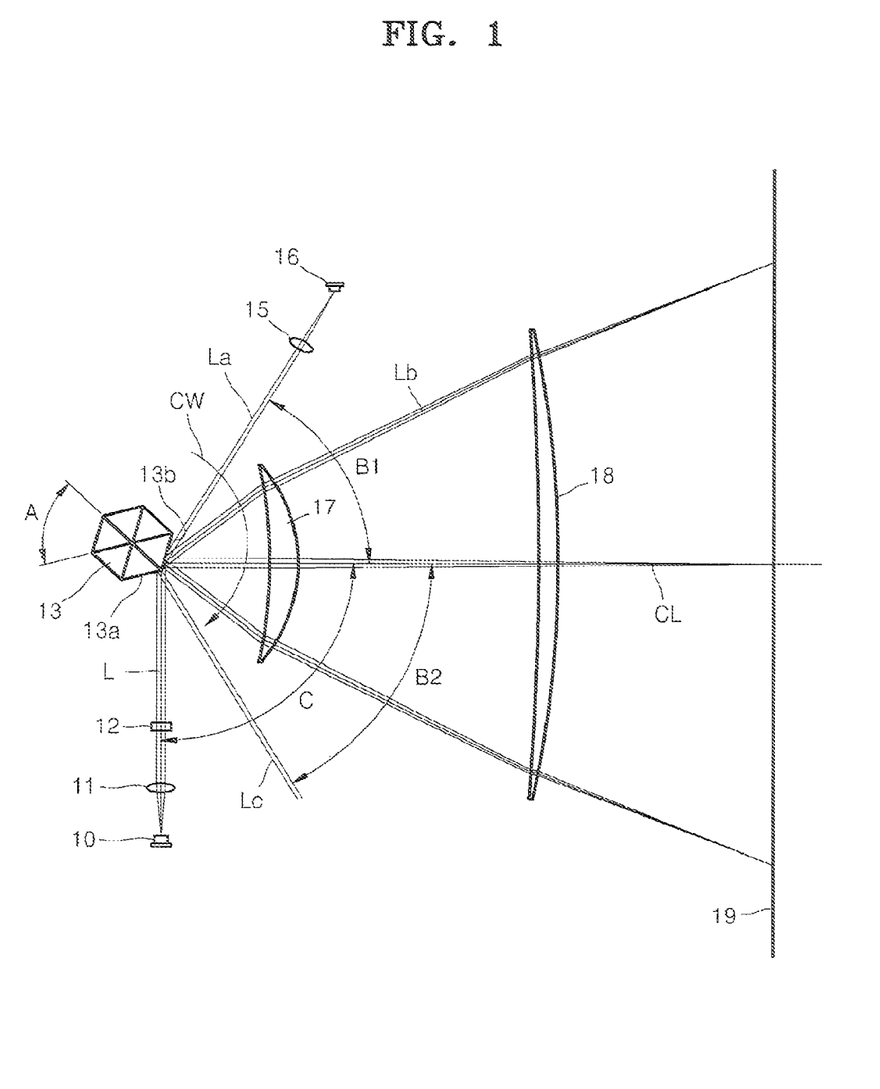
FIG. 1 is a cross-sectional view illustrating a light scanning unit seen along a main-scanning plane, according to an embodiment.

FIG. 1 is a cross-sectional view illustrating a light scanning unit seen along a main-scanning plane. Referring to FIG. 1, the light scanning unit may include a light source 10, a polygon mirror 13, image forming optical systems 17 and 18, and a synchronization detection optical system that may include a synchronization detection lens 15 and sensor 16.

The light source 10 may be a laser diode emitting laser light. The polygon mirror 13 may have a plurality of deflection surfaces, such as 13a and 13b, and a plurality of edges at which the deflection surfaces, such as 13a and 13b, meet. The polygon mirror 13 deflects and scans light L emitted from the light source 10 and may be rotated by, for example, a motor (not shown). In the current embodiment illustrated in FIG. 1, the polygon mirror 13 is a hexagonal mirror, but the polygon mirror 13 is not limited thereto; the polygon mirror 13 may be, for example, a pentagonal, heptagonal, or octagonal mirror. A spacing angle A of the polygon mirror 13 may typically be defined as a value obtained by dividing 360 degrees by the number of deflection surfaces of the polygon mirror 13. Thus, for a hexagonal mirror, the spacing angle A is 60 degrees.

Referring to FIG. 1, the light L is incident on the polygon mirror 13 at an incident angle C, defined as the angle between the light L emitted from the light source 10 and a main scanning center line CL of light scanned to a scanning surface 19. The main scanning center line CL is defined as an optical path of light for scanning, which is oriented to the center of a scanning area. By increasing the incident angle C to be larger than the spacing angle A, the angle range of light deflected and scanned by the polygon mirror 13 may be enlarged. In FIG. 1, the incident angle C is illustrated as approximately 90 degrees but is not limited to such an angle.

A collimating lens 11 and a cylindrical lens 12 may be disposed between the light source 10 and the polygon mirror 13. The collimating lens 11 collimates, or straightens, light L emitted from the light source 10 to be parallel light or converging light. The cylindrical lens 12 collimates the light L that has passed through the collimating lens 11 in a direction corresponding to a main scanning direction and/or sub-scanning direction, so as to linearly condense or contract the light incident on the polygon mirror 13. The cylindrical lens 12 may be formed of at least one lens.

The light scanning unit may further include image forming optical systems 17 and 18, which condense the light L deflected by the polygon mirror 13 to the scanning surface 19. The image forming optical systems 17 and 18 may each include at least one scanning lens, such as an f-θ lens, that allows the light L deflected by the polygon mirror 13 to be condensed on the scanning surface 19 and to be scanned in a main scanning direction at a uniform linear speed. In FIG. 1, the light scanning unit includes image forming optical systems 17 and 18 that together include two scanning lenses. The optical configuration of the image forming optical systems 17 and 18 may, however, vary and include fewer or more lenses. For example, the image forming optical systems 17 and 18 may be formed of one scanning lens.

A synchronization detection optical system may be incorporated into the light scanning unit and may include a synchronization detection sensor 16 to detect synchronization of light deflected by the polygon mirror 13 in a main scanning direction. The synchronization detection optical system may detect light La that is divided and reflected at an edge of the polygon mirror 13. Thus, as the light La may be used as light for synchronization detection, most of light Lb, which is deflected and reflected on a deflection surface of the polygon mirror 13, may be scanned to the scanning surface 19.

In the optical configuration of the embodiment shown in FIG. 1, the light La divided and reflected at an edge of the polygon mirror 13 may be deflected from the direction of incidence of the light L at an angle approximately corresponding to the spacing angle A. Accordingly, in order to detect the light La that is divided and reflected at an edge of the polygon mirror 13, the synchronization detection optical system may be disposed on an optical path of the light La. An angle B1 of the light La for synchronization detection is defined as the angle between the main scanning center line CL of the light scanned to the scanning surface 19 and the light La.

Although in the embodiment illustrated in FIG. 1 the synchronization detection optical system is disposed on the optical path of the light La, embodiments are not limited to such a configuration. For example, when the incident angle C of light incident to the polygon mirror 13 is changed, the angle of the light La for synchronization detection may slightly deviate from the spacing angle A. Moreover, the incident light L may be divided and reflected at the edge of the polygon mirror 13 if the edge of the polygon mirror 13 is smaller than the optical thickness of the light L. Thus the angle at which the light is divided and reflected at the edge of the polygon mirror 13 may slightly deviate from the spacing angle A depending upon the optical thickness of the light L and the size of the edge of the polygon mirror 13. Taking these possible deviations into account, the synchronization detection optical system may be arranged to satisfy the angle relationship of Equation 1 below, where A is a spacing angle of the polygon mirror 13 and B1 is the angle between the main scanning center line CL and the light La.

$$0.9 \leq B1/A \leq 1.1 \qquad \text{Equation 1}$$

The synchronization detection optical system may further include a synchronization detection lens 15, which may be disposed between the polygon mirror 13 and the synchronization detection sensor 16. The synchronization detection lens 15 may collimate or straighten light La for synchronization detection to the synchronization detection sensor 16.

The synchronization detection optical system may be disposed such that the light La for synchronization detection does not pass through the image forming optical systems 17 and 18. In such a configuration, light Lb is incident on the image forming optical systems 17 and 18 may be completely scanned to the scanning surface 19.

Figure 2:
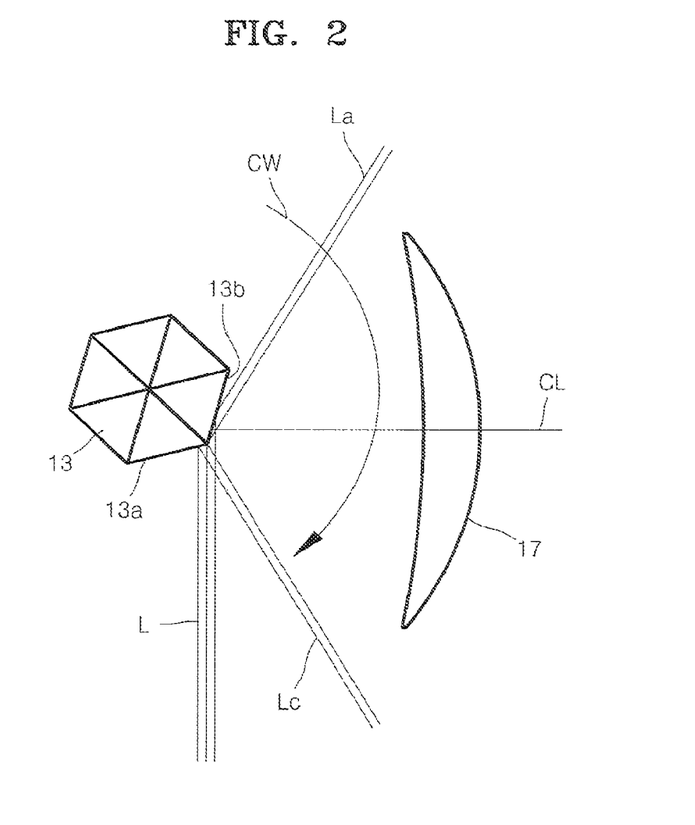
FIG. 2 illustrates the optical configuration of the light scanning unit of FIG. 1 in which beams for synchronization detection are divided at an edge of a beam deflector.

With reference to FIG. 2, the division and reflection of light at an edge of the polygon mirror 13 is described. An edge of the polygon mirror 13 is the boundary where two continuing deflection surfaces, such as deflection surfaces 13a and 13b, meet. Light L incident on the edge of the polygon mirror 13 is divided into light La and Lc and reflected on the deflection surfaces 13a and 13b at either side of the edge. An angle B2 of the light Lc is defined as the angle between the main scanning center line CL of the light scanned to the scanning surface 19 and the light Lc. The sum of the angle B1 of the light La and the angle B2 of the light Lc may correspond approximately to the maximum scanning angle of the light scanning unit. Light La and Lc extend in different directions due to being deflected over an edge of the polygon mirror 13 (i.e. deflected by two different surfaces of the polygon mirror 13).

If the polygon mirror 13 is rotated clockwise, the incident light L is first deflected and reflected on the deflection surface 13a, and then on the next deflection surface 13b. Divisional reflection on the edge of the polygon mirror 13 occurs after reflection on the deflection surface 13a and before reflection on the next deflection surface 13b. Since the light La for synchronization detection is divided at the edge of the polygon mirror 13, the optical width of the light La for synchronization detection, in a main scanning direction, may be smaller than the optical width of light L incident on the polygon mirror 13 in a main scanning direction. Thus, the amount of the light La for synchronization detection may be smaller than the amount of the light L incident on the edge of the polygon mirror 13.

Referring again to FIG. 1, the synchronization detection optical system may be arranged such that the light La reflected at the deflection surface 13b, at which surface the scanning light Lb will be subsequently deflected, is detected. Consequently, the light La incident on the synchronization detection optical system and the light Lb scanned to the scanning surface 19 are reflected on the same deflection surface 13b. Accordingly, the synchronization detection system may detect synchronization signals before the light Lb is scanned to the scanning surface 19, and thus error of scanning starting positions due to error of spacing angles between surfaces of the polygon mirror 13 is solved optically.

The polygon mirror 13 may rotate in a clockwise or a counter-clockwise direction. If rotated in a counter-clockwise direction, the synchronization detection optical system may be arranged on an optical path of the light Lc. The image forming optical systems 17 and 18 may also be used when the polygon mirror 13 is rotated counter-clockwise. When the light scanning unit is arranged such that the light La and Lc for synchronization detection does not pass through the image forming optical systems 17 and 18, the image forming optical systems 17 and 18 may be designed regardless of the rotational direction of the polygon mirror 13.

Figure 3:
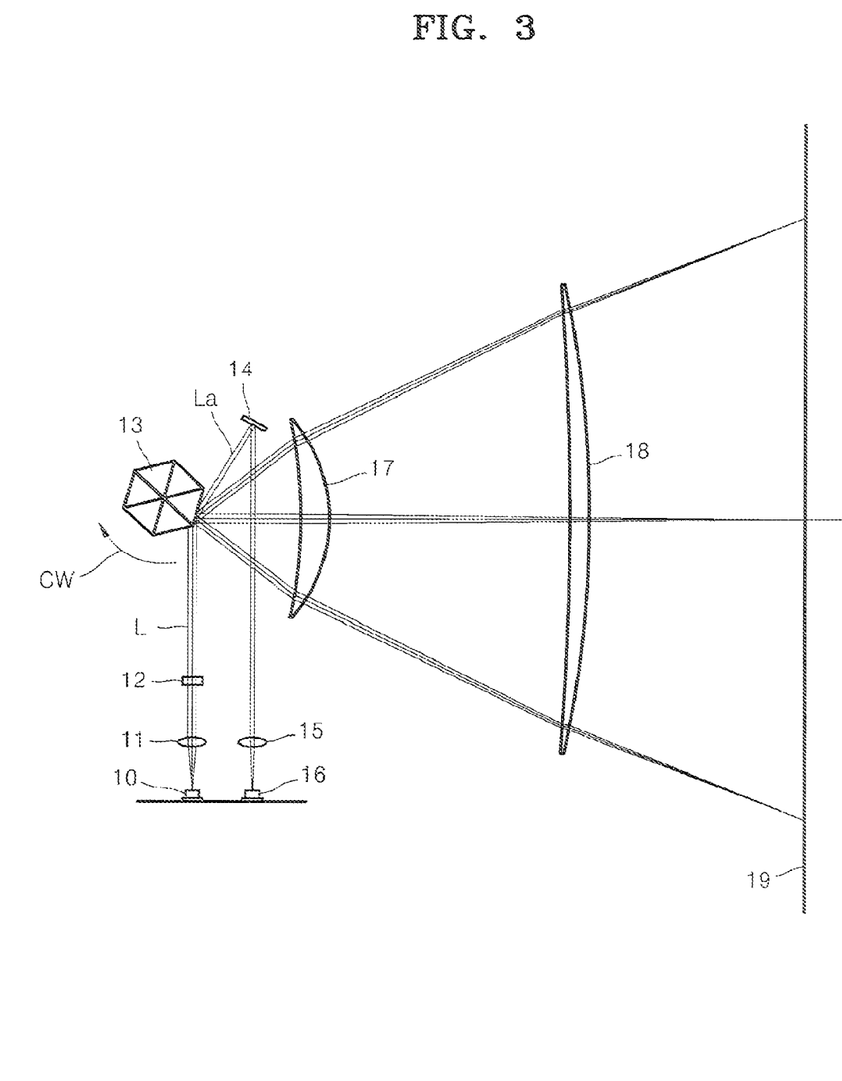
FIG. 3 illustrates another example of the light scanning unit of FIG. 1.

FIG. 3 illustrates an additional embodiment of a light scanning unit. The light scanning unit of FIG. 3 is substantially the same as the light scanning unit of FIG. 1 except for the arrangement of the synchronization detection optical system. Thus, like reference numerals denote like elements and description thereof is unnecessary.

Referring to FIG. 3, the synchronization detection optical system further includes a reflection mirror 14. The reflection mirror 14 reflects light La for a synchronization signal that is deflected and reflected away from the light source 10 to be returned to a position near the light source 10. Thus, by arranging the synchronization detection sensor 16 near the light source 10, the light scanning unit may be packaged compactly.

Figure 4:
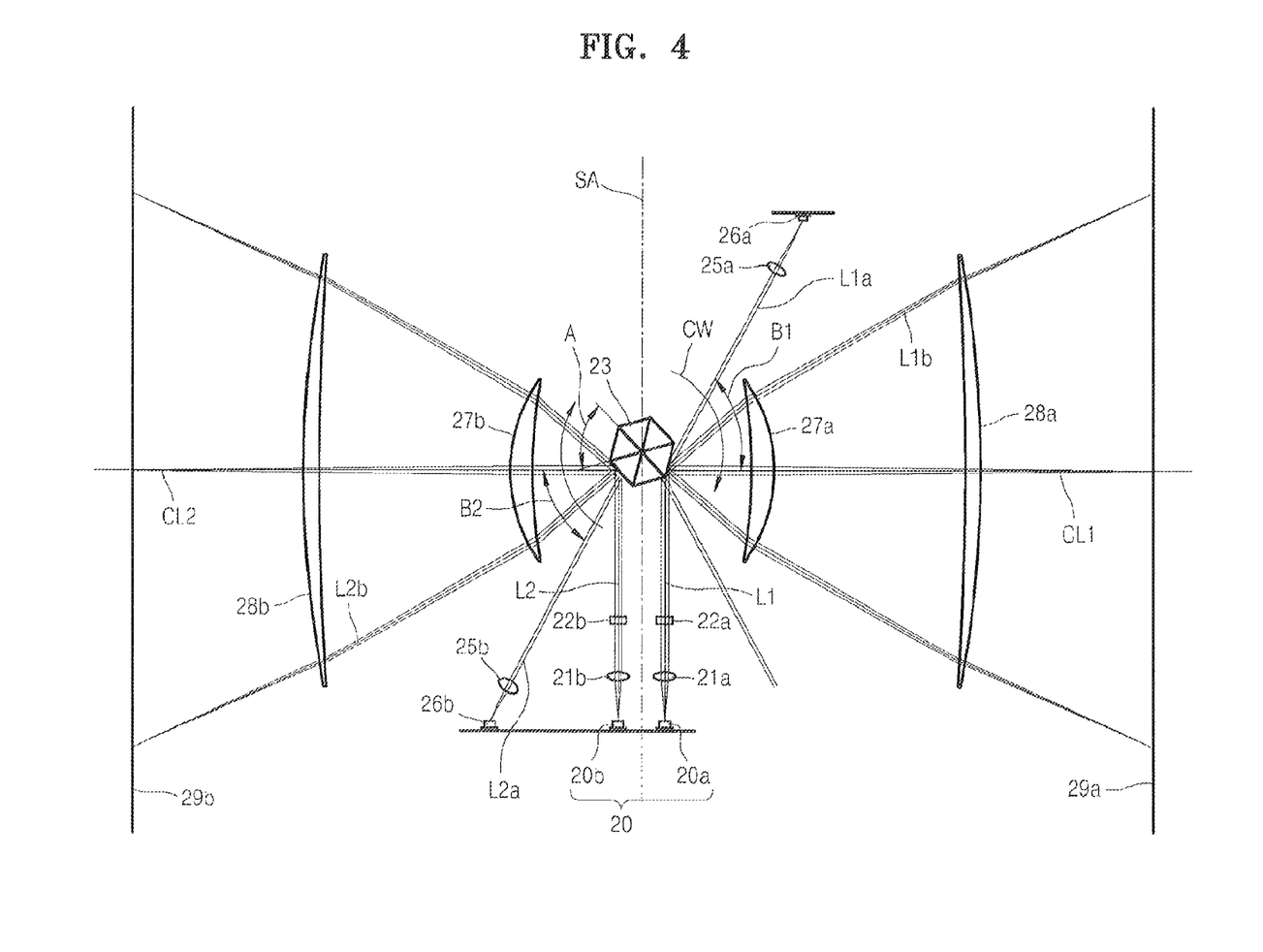
FIG. 4 is a cross-sectional view of a light scanning unit according to another embodiment.

FIG. 4 is a cross-sectional view of a light scanning unit according to yet another embodiment. The light scanning unit includes a light source unit 20, a polygon mirror 23, and a synchronization detection optical system.

The light source unit 20 may include first and second light sources 20a and 20b. Light L1 and L2 are respectively emitted from the first and second light sources 20a and 20b and are respectively deflected and scanned to scanning surfaces 29a and 29b through different deflection surfaces of a common polygon mirror 23. The first and second light sources 20a and 20b may be arranged symmetrically around a center, symmetrical axis SA passing through a center axis of the polygon mirror 23. If the polygon mirror 23 rotates clockwise (CW), as illustrated in FIG. 4, light L1 emitted from the first light source 20a and deflected towards scanning surface 29a by the polygon mirror 23 is scanned from top to bottom. The light L2 emitted from the second light source 20h and deflected towards scanning surface 29b by the polygon mirror 23 is scanned from bottom to top. The first and second light sources 20a and 20b may be arranged so that the incident angles of the light L1 and L2 incident on the polygon mirror 23 with respect to the main scanning center lines CL1 and CL2 are greater than the spacing angle A of the polygon mirror 23.

The light scanning unit according to the embodiment of FIG. 4 may further include first and second collimating lenses 21a and 21b and first and second cylindrical lenses 22a and 22b, which are respectively disposed between the first and second light sources 20a and 20b and the polygon mirror 23. The first and second collimating lenses 21a and 21b may be respectively disposed between the first and second light sources 20a and 20b and the first and second cylindrical lenses 22a and 22b.

The light scanning unit may further include first image forming optical systems 27a and 28a and second image forming optical systems 27b and 28b. The image forming optical systems condense the light L1 and L2 deflected by the polygon mirror 23 to the scanning surfaces 29a and 29b. The first and second image forming optical systems 27a, 27b, 28a, and 28b each may include at least one scanning lens, such as an f-θ lens, that allows the deflected light L1 and L2 to be condensed on the scanning surfaces 29a and 29b and to be scanned in a main scanning direction at a uniform linear speed.

The light scanning unit may include a synchronization detection optical system that may include a first and/or second synchronization detection unit. The first and second synchronization units respectively detect light L1a and L2a respectively emitted from the first and second light sources 20a and 20b and reflected at different edges of the polygon mirror 23. The first and second synchronization detection units may include first and second synchronization detection lenses 25a and 25b and first and second synchronization detection sensors 26a and 26b, respectively. The first and second synchronization detection units may be arranged symmetrically with respect to the polygon mirror 23 to respectively detect the light L1a and L2a emitted from the first and second light sources 20a and 20b and divided at different edges of the polygon mirror 23. For example, the first and second synchronization detection units may be arranged in a diagonal configuration in which the units are diagonal with respect to one another. The light L1a and L2a may be deflected and reflected approximately at the spacing angle A of the polygon mirror 23 from the direction of incidence of the light L1 and L2, respectively. Accordingly, the first and second synchronization detection units may be disposed on optical paths of the light L1a and L2a. Angles B1 and B2 of the light L1a and L2a may be defined based on main scanning center lines CL1 and CL2 of the light deflected and scanned by the polygon mirror 23 in a main scanning direction of the scanning surfaces 29a and 29b. As described above, the angles B1 and B2 of the light L1a and L2a are not limited to the spacing angle A of the polygon mirror 23 and may be a value approximately near to the spacing angle A. For example, the light L1a and L2a divided and reflected at the edges of the polygon mirror 23 may be deflected at an angle in the range of the spacing angle A±10%.

Since the light L1a and L2a detected in the synchronization detection optical system are divided at the edges of the polygon mirror 23, the optical width of each of the light L1a and L2a may be smaller than the optical width of the light L1 and L2 incident on the polygon mirror 23. Additionally, the amount of the light L1a and L2a incident on the synchronization system may be smaller than the amount of the light L1 and L2 incident on the polygon mirror 23.

The first and second synchronization detection units may be arranged such that light that is reflected at a deflection surface of the polygon mirror 23, at which surface light for scanning will be subsequently deflected, is detected. In the embodiment shown in FIG. 4, among the two lights L1a and L1b emitted from the first light source 20a and divided at an edge of the polygon mirror 23, the light L1a is used as light for synchronization detection. Among the two divided lights L2a and L2b emitted from the second light source 20b and divided at another edge of the polygon mirror 23, the light L2a is used as light for synchronization detection. The first synchronization detection unit may be arranged substantially in the same arrangement as the synchronization detection system described with reference to FIG. 2. That is, provided that the polygon mirror 23 rotates clockwise, the first synchronization detection unit may be disposed to the right of and above the polygon mirror 23, so that, among the light L1a for synchronization detection and light L1b for scanning, which are deflected in sequence on the same deflection surface of the polygon mirror 23, the light L1a for synchronization detection may be detected. Also, the second synchronization detection unit may be disposed to the left of and below the polygon mirror 23 so that among the light L2a for synchronization detection and light L2b for scanning, which are deflected in sequence on the same deflection surface, the light L2a for synchronization detection can be detected. The optical arrangement of the second synchronization detection unit corresponds to a case where the polygon mirror 23 rotates counter-clockwise. As the light L1a and L2a for synchronization detection and the light L1b and L2b for scanning are deflected in sequence on the same deflection surface of the polygon mirror 23, error of the scanning starting positions caused by error of the spacing angles between the surfaces of the polygon mirror 23 is therefore solved optically in the light scanning unit according to the present embodiment that utilizes a cross-scanning method.

Also, the first and second synchronization detection units may be arranged such that the lights L1a and L2a for synchronization detection do not pass the first and second image forming optical systems 27a, 28a and 27b, 28b. In this case, the first and second image forming optical systems 27a, 28a and 27b, 28b are used only to condense the light L1b and L2b for scanning. Also, the light deflected and scanned to the left and right by the polygon mirror 23 is optically symmetrical around the symmetrical axis SA. Accordingly, the first and second image forming optical systems 27a, 28a and 27b, 28b may be formed of lenses of the same type, regardless of the side of the polygon mirror 23 at which it is formed.

Figure 5:
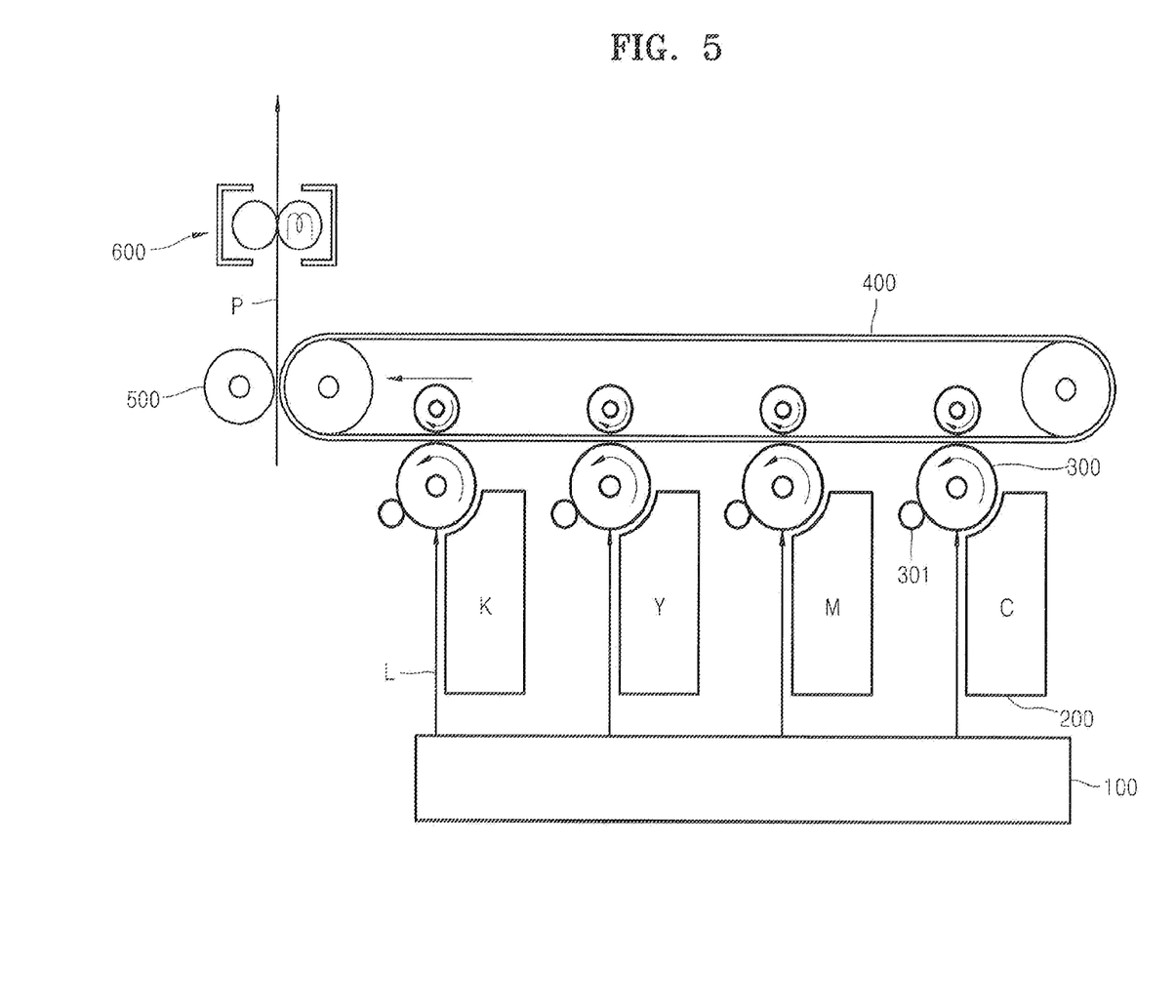
FIG. 5 is a schematic view of an image forming apparatus according to an embodiment.

FIG. 5 is a schematic view of an image forming apparatus according to an embodiment. Referring to FIG. 5, the image forming apparatus may include a light scanning unit 100, developing units 200, photosensitive drums 300, a charging roller 301, an intermediate transfer belt 400, a transfer roller 500, and a fixing unit 600.

The light scanning unit 100 scans light L, modulated according to image information, to the photosensitive drums 300. The photosensitive drums 300 are an example of a photosensitive body, and each may comprise a photosensitive layer having a predetermined thickness coated on a circumferential surface of a cylindrical metal pipe, for example. Circumferential surfaces of the photosensitive drums 300 correspond to scanning surfaces, on which light scanned by the light scanning unit 100 is condensed. Also, a photosensitive belt may be applied as a photosensitive body. The charging roller 301 is an example of a charging device that contacts the photosensitive drums 300 and rotates to charge the surface of the photosensitive drums 300 to uniform potentials. A charging bias Vc may be applied to the charging roller 301. A corona charger (not shown) may be used instead of the charging roller 301. Toner is accommodated inside the developing units 200. The toner is moved to the photosensitive drums 300 by a development bias applied between the developing units 200 and the photosensitive drums 300, thereby developing electrostatic latent images into visible toner images. A toner image formed on the photosensitive drums 300 is transferred to the intermediate transfer belt 400. The toner image is transferred to paper P, which is transported between the transfer roller 500 and the intermediate transfer belt 400 by a transfer bias applied to the transfer roller 500. The toner image that is transferred to the paper P receives heat and pressure from the fixing unit 600 and is fixed on the paper P, thereby forming an image.

In order to print a color image, electrostatic latent images corresponding to image information of black (K), magenta (M), yellow (Y), and cyan (C) are formed in the four photosensitive drums 300. The four developing units 200 respectively supply black (K), magenta (M), yellow (Y), and cyan (C) toners to the photosensitive drums 300 to form toner images of black (K), magenta (M), yellow (Y), and cyan (C) colors. After the toner images of black (K), magenta (M), yellow (Y), and cyan (C) are overlapped with one another and transferred to the intermediate transfer belt 400, they are transferred to the paper P.

Figure 6:
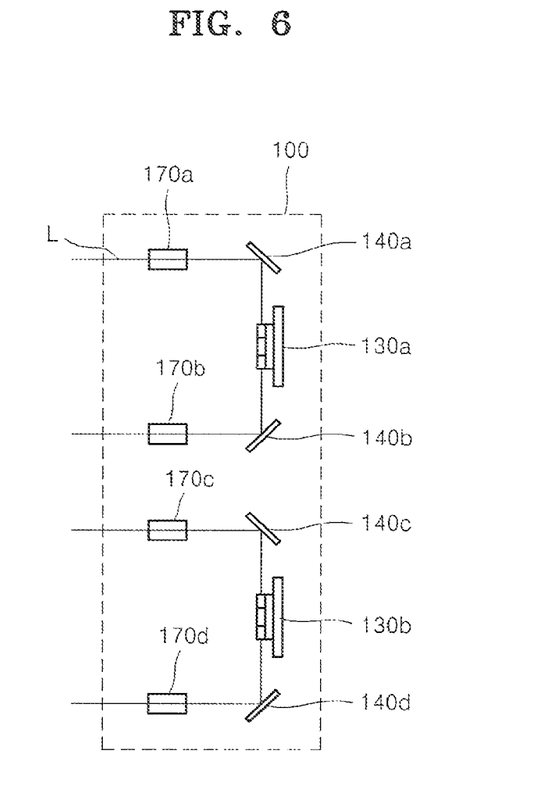
FIG. 6 illustrates the arrangement of a light scanning unit included in the image forming apparatus of FIG. 5, according to an embodiment.

FIG. 6 illustrates an arrangement of a light scanning unit 100 that may be included in the image forming apparatus of FIG. 5, according to an embodiment. Referring to FIG. 6, the light scanning unit 100 includes two polygon mirrors 130a and 130b, mirrors 140a, 140b, 140c, and 140d that fold optical paths of four lights L deflected and scanned by the polygon mirrors 130a and 130b, and image forming optical systems 170a, 170b, 170c, and 170d condensing the lights L on the scanning surfaces, for example, on the circumferential surfaces of the photosensitive drums 300 of FIG. 5. The light scanning unit 100 may be formed by combining two light scanning units described with reference to FIG. 4 and interposing mirrors between the polygon mirrors and the image forming optical systems. The two polygon mirrors 130a and 130b in FIG. 6 may correspond to the polygon mirror 23 of the light scanning unit described with reference to FIG. 4, and each of the four image forming optical systems 170a, 170b, 170c, and 170d may correspond to the first image forming optical system or the second image forming optical system described with reference to FIG. 4. The light scanning unit 100 illustrated in FIG. 6 uses a cross-scanning method but is not limited thereto. For example, four of the light scanning units described with reference to FIG. 1 may be applied as the light scanning unit 100. In this case, the four light scanning units may respectively scan light to four photosensitive drums 300.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A light scanning unit comprising:
a light source unit to emit a light beam;
a polygon mirror to deflect and scan the emitted light beam in a main scanning direction according to a rotation direction of the polygon mirror, the polygon mirror having a plurality of deflection surfaces and a plurality of edges at which adjacent deflection surfaces meet one another;
an image forming optical system including at least one f-θ lens to condense the light beam deflected by the polygon mirror to a surface of a photosensitive drum; and
a synchronization detection optical system including a detection sensor to detect a portion of the light beam that is divided and reflected at an edge of the polygon mirror,
wherein the portion of the light beam incident on the detection sensor does not pass through an area of the at least one f-θ lens of the image forming optical system regardless of the rotation direction of the polygon mirror and the at least one f-θ lens is designed regardless of the rotation direction of the polygon mirror,
wherein the detection sensor is arranged to satisfy an angle relationship of $0.9 \leq B/A \leq 1.1$, where A is a spacing angle of the polygon mirror and B is an angle of light that is deflected by the polygon mirror and detected by the detection sensor, with reference to a main scanning center line of light that is deflected and scanned by the polygon mirror, wherein the light from the polygon mirror is incident on the synchronization detection optical system without intervention of a reflection mirror.

2. The light scanning unit of claim 1, wherein an optical width of light in the main scanning direction, reflected by the polygon mirror and incident on the synchronization detection optical system, is smaller than an optical width of light in the main scanning direction, incident on the polygon mirror.

3. The light scanning unit of claim 1, wherein an amount of light reflected at an edge of the polygon mirror and directed to the synchronization detection optical system is smaller than an amount of light incident on the edges of the polygon mirror.

4. The light scanning unit of claim 1, wherein the synchronization detection optical system detects, among light divided at an edge of the polygon mirror, light reflected at a deflection surface.

5. The light scanning unit of claim 1, further comprising a collimating lens and a cylindrical lens disposed between the light source unit and the polygon mirror,
wherein the synchronization detection optical system comprises a synchronization detection lens disposed between the polygon mirror and the detection sensor.

6. The light scanning unit of claim 1, wherein the light source unit comprises first and second light sources, and the synchronization detection optical system comprises first and second synchronization detection units for respectively detecting portions of light beams emitted from the first and second light sources and divided at different edges of the polygon mirror.

7. The light scanning unit of claim 6, wherein the first and second synchronization detection units are arranged diagonal-symmetrically with respect to the polygon mirror.

8. The light scanning unit of claim 6 wherein the image forming optical system comprises first and second scanning lenses that respectively condense the light beams emitted from the first and second light sources and deflected by the polygon mirror, wherein the portions of the light beams incident on the first and second synchronization detection units do not pass through the first and second scanning lenses.

9. The light scanning unit of claim 1, wherein an incident angle of light incident from the light source unit to the polygon mirror with reference to the main scanning center line of light is greater than the spacing angle of the polygon mirror.

10. An image forming apparatus comprising:
a photosensitive drum;
a light scanning unit comprising:
a light source unit to emit a light beam;
a polygon mirror to deflect and scan the emitted light beam in a main scanning direction according to a rotation direction of the polygon mirror, the polygon mirror having a plurality of deflection surfaces and a plurality of edges at which adjacent deflection surfaces meet one another;
an image forming optical system including at least one f-θ lens to condense the light beam deflected by the polygon mirror to a surface of the photosensitive drum to form electrostatic latent images; and
a synchronization detection optical system including a detection sensor to detect a portion of the light beam that is divided and reflected at an edge of the polygon mirror;
a developing unit to develop the electrostatic latent images into visible toner images; and
a transfer unit to transfer the toner images developed by the developing unit to a printing medium, wherein the light incident on the detection sensor does not pass through an area of the at least one f-θ lens of the image forming optical system regardless of the rotation direction of the polygon mirror, and the at least one f-θ lens is designed regardless of the rotation direction of the polygon mirror, wherein the detection sensor is arranged to satisfy the following angle relationship, $0.9 \leq B/A \leq 1.1$, where A is a spacing angle of the polygon mirror and B is an angle of light that is deflected by the polygon mirror and detected by the detection sensor, with reference to a main scanning center line of light that is deflected and scanned by the polygon mirror, wherein the light from the polygon mirror is directly incident on the detection sensor without reflection.

11. The image forming apparatus of claim 10, wherein the synchronization optical system detects, among light divided at the edges of the polygon mirror, light that is reflected at a deflection surface.

12. The image forming apparatus of claim 10, wherein the synchronization detection optical system comprises a synchronization detection lens disposed between the polygon mirror and the detection sensor.

13. The image forming apparatus of claim 10, wherein the light source unit comprises at least two light sources, wherein light beams emitted from the at least two light sources are respectively deflected and scanned on different deflection surfaces of the polygon mirror.

14. The image forming apparatus of claim 13, wherein the light source unit comprises first and second light sources, wherein the synchronization detection optical system comprises first and second synchronization detection units for respectively detecting a portion of the light beams emitted from the first and second light sources and divided at different edges of the polygon mirror.

15. The image forming apparatus of claim 14, wherein the first and second synchronization detection units respectively detect, among light emitted from the first and second light sources and divided in two directions at different edges of the polygon mirror, light reflected at a deflection surface.

16. The image forming apparatus of claim 15, wherein the first and second synchronization detection units are arranged diagonal-symmetrically with respect to the polygon mirror.

17. The image forming apparatus of claim 16, wherein the image forming optical system comprises first and second scanning lenses that respectively condense the light beams emitted from the first and second light sources and deflected by the polygon mirror, wherein the portions of the light beams incident on the first and second synchronization detection units do not pass through the first and second scanning lenses.

18. The image forming apparatus of claim 10, wherein an incident angle of light that is incident from the light source unit to the polygon mirror with reference to the main scanning center line of light is greater than the spacing angle of the polygon mirror.

* * * * *

UNITED STATES PATENT AND TRADEMARK OFFICE
CERTIFICATE OF CORRECTION

PATENT NO. : 9,057,878 B2  Page 1 of 1
APPLICATION NO. : 13/221076
DATED : June 16, 2015
INVENTOR(S) : Hyung-soo Kim It is certified that error appears in the above-identified patent and that said Letters Patent is hereby corrected as shown below:

IN THE CLAIMS
Col. 11, line 15, claim 10, after "mirror" insert --and--.

Signed and Sealed this
Thirteenth Day of October, 2015

Michelle K. Lee
*Director of the United States Patent and Trademark Office*